(12) United States Patent
Hung

(10) Patent No.: US 8,179,748 B2
(45) Date of Patent: May 15, 2012

(54) LIMITING SWITCH CONTROL METHOD INCLUDING AN APPENDED-FUNCTION UNIT

(75) Inventor: Jui-Pin Hung, Taipei (TW)

(73) Assignee: Sunplus Technology Co., Ltd., Hsinchu Science Park (TW)

( * ) Notice: Subject to any disclaimer, the term of this patent is extended or adjusted under 35 U.S.C. 154(b) by 1232 days.

(21) Appl. No.: 11/929,144

(22) Filed: Oct. 30, 2007

(65) Prior Publication Data

US 2008/0109833 A1  May 8, 2008

(30) Foreign Application Priority Data

Nov. 2, 2006 (TW) .............................. 95140620 A

(51) Int. Cl.
*G11B 21/08* (2006.01)
(52) U.S. Cl. .................................................. 369/30.27
(58) Field of Classification Search ............... 369/30.27, 369/30.1–30.17, 53.2, 53.41; 720/601–608, 720/658–663
See application file for complete search history.

(56) References Cited

U.S. PATENT DOCUMENTS

| 5,021,898 A * | 6/1991 | Sakai et al. ................ 369/30.15 |
| 6,922,378 B2 * | 7/2005 | Shen .......................... 369/30.27 |
| 7,420,348 B2 * | 9/2008 | Fukamizu et al. ......... 369/30.17 |
| 2004/0196749 A1 * | 10/2004 | Kim et al. .................. 369/30.13 |
| 2005/0013209 A1 * | 1/2005 | Hsu ............................ 369/30.27 |
| 2005/0013210 A1 * | 1/2005 | Lee ............................. 369/30.27 |
| 2005/0117467 A1 * | 6/2005 | Kimikawa ................ 369/30.27 |
| 2005/0141356 A1 * | 6/2005 | Fujisawa .................... 369/30.27 |

* cited by examiner

*Primary Examiner* — Tan X Dinh
(74) *Attorney, Agent, or Firm* — Kirton McConkie; Evan R. Witt

(57) ABSTRACT

A limit switch controlling method and apparatus used in an optical drive are disclosed. When the optical drive is executing a tray-in/tray-out action or a move-sled home action, a detect-tray-in-switch pin, a detect-tray-out-switch pin, or a detect-sled-limit-switch pin of a controlling chip is used to receive a signal from a limit switch. When the optical drive is not executing the tray-in/tray-out action or the move-sled-home action, the detect-tray-in-switch pin, the-detect tray-out-switch pin, or the detect-sled-limit-switch pin of the controlling chip is used as an I/O port.

18 Claims, 10 Drawing Sheets

LIMITING SWITCH CONTROL METHOD INCLUDING AN APPENDED-FUNCTION UNIT

FIELD OF THE INVENTION

The present invention relates to a limit switch controlling circuit of an optical drive, and more particularly to a limit switch controlling circuit having I/O ports used in an optical drive.

BACKGROUND OF THE INVENTION

In electric industry, providing more functions in a single chip under a limit space and limit number of pins is an important issue. Therefore, how to design a chip with some specific pins having multiple functions is a big challenge to chip designers.

In a controlling chip of an optical drive, there are two pins function for detecting the position of a tray of the optical drive, wherein one is called detect-tray-in-switch pin which is for determining whether the tray is moved at a complete-tray-in position or not; the other is called detect-tray-out-switch pin which is for determining whether the tray is moved at a complete-tray-out position or not. In another word, the tray will be moved to the complete-tray-in position through the driving of a tray motor if simultaneously the tray is at the complete-tray-out position and an eject button of the optical drive is pressed by user. Accordingly, the tray will be moved to the complete-tray-out position through the driving of the tray motor if simultaneously the tray is at the complete-tray-in position and the eject button is pressed by user. The tray motor is controlled to stop driving when the tray is at the complete-tray-in position or the complete-tray-out position. The above-mentioned movement of a tray of an optical drive is defined as a tray-in/tray-out action.

FIG. 1 is a diagram showing a limit switch circuit for detecting the position of a tray of an optical drive in prior art. The limit switch circuit comprises: a controlling chip 10, a tray 12, and a first limit switch 14. The controlling chip 10 further comprises a servo controlling unit 102, a detect-tray-in-switch pin 104, and a detect-tray-out-switch pin 106. The detect-tray-in-switch pin 104 is coupled to a voltage source (Vcc) through a resistance (R1); the detect-tray-out-switch pin 106 is coupled to the voltage source (Vcc) through a resistance (R2); and the first limit switch 14 is coupled to the detect-tray-in-switch pin 104, the detect-tray-out-switch pin 106, and a ground (GND). According to the position of the tray 12, the first limit switch 14 serves to connect the detect-tray-in-switch pin 104 to the ground (GND), to connect the detect-tray-out-switch pin 106 to the ground (GND), or to disconnect both the detect-tray-in-switch pin 104 and the detect-tray-out-switch pin 106 to the ground (GND). The main function of the limit switch circuit is for detecting the position of the tray 12 and further controlling a tray motor according to the position of the tray 12. The tray 12 is designed to mechanically trigger the first limit switch 14 when the tray 12 is moved to the complete-tray-in position or the complete-tray-out position after the optical drive executing the tray-in/tray-out action. When the first limit switch 14 is triggered, signals received by the detect-tray-in-switch pin 104 and the detect-tray-out-switch pin 106 can be detected by the controlling chip 10 to determine the position of the tray 12, and then further controls the driving of the tray motor.

For example, when the optical drive is executing the tray-in/tray-out action but before the tray 12 reaching the complete-tray-in position or the complete-tray-out position, the first limit switch 14 disconnects both the detect-tray-in-switch pin 104 and the detect-tray-out-switch pin 106 to the ground (GND). Therefore, both the detect-tray-in-switch pin 104 and the detect-tray-out-switch pin 106 receive a high-level signal (Vcc) to the servo controlling unit 102. In another word, when the servo controlling unit 102 detects that both the detect-tray-in-switch pin 104 and the detect-tray-out-switch pin 106 receive a high level signal, the controlling chip 10 can determine the optical drive is executing the tray-in/tray-out action, but the tray 12 is not yet reaching the complete-tray-in position or the complete-tray-out position.

FIG. 2 is a diagram showing the limit switch circuit when the tray 12 is at the complete-tray-in position. The tray 12 mechanically triggers the first limit switch 14 in response to the tray 12 being moved to the complete-tray-in position. The first limit switch 14 then connects the detect-tray-in-switch pin 104 to the ground (GND), so as the detect-tray-in-switch pin 104 receives a low-level signal (GND) and the detect-tray-out-switch pin 106 still receives a high-level signal. In another word, when the servo controlling unit 102 detects that the detect-tray-in-switch pin 104 receives a low-level signal and the detect-tray-out-switch pin 106 receives a high-level signal, the controlling chip 10 can determine that the tray 12 is at the complete-tray-in position. Accordingly, when the tray 12 stop mechanically triggering the first limit switch 14 after the tray 12 leaving the complete-tray-in position, the first limit switch 14 then disconnects the detect-tray-in-switch pin 104 to the ground (GND), so as the detect-tray-in-switch pin 104 receives a high-level signal changed from the low-level signal. In another word, when the servo controlling unit 102 detects that the signal received by the detect-tray-in-switch pin 104 is changed from the low-level signal to a high-level signal, the controlling chip 10 can determine the tray 12 has left the complete-tray-in position.

FIG. 3 is a diagram showing the limit switch circuit when the tray 12 is at the complete-tray-out position. The tray 12 mechanically triggers the first limit switch 14 in response to the tray 12 being moved to the complete-tray-out position. The first limit switch 14 then connects the detect-tray-out-switch pin 106 to the ground (GND), so as the detect-tray-out-switch pin 106 receives a low-level signal and the detect-tray-in-switch pin 104 still receives a high-level signal. In another word, when the servo controlling unit 102 detects that the detect-tray-out-switch pin 106 receives a low-level signal and the detect-tray-in-switch pin 104 receives a high-level signal, the controlling chip 10 can determine that the tray 12 is at the complete-tray-out position. Accordingly, when the tray 12 stop mechanically triggering the first limit switch 14 after the tray 12 leaving the complete-tray-out position, the first limit switch 14 then disconnects the detect-tray-out-switch pin 106 to the ground (GND), so as the detect-tray-out-switch pin 106 receives a high-level signal changed from the low-level signal. In another word, when the servo controlling unit 102 detects that the signal received by the detect-tray-out-switch pin 104 is changed from the low-level signal to a high-level signal, the controlling chip 10 can determine the tray 12 has left the complete-tray-out position.

The detect-tray-in-switch pin 104 and the detect-tray-out-switch pin 106 are on duty only when the controlling chip 10 is detecting the position of the tray 12 under the optical drive executing the tray-in/tray-out action. Out of the tray-in/tray-out action, the signals at the detect-tray-in-switch pin 104 and the detect-tray-out-switch pin 106 do not make any affection to the operation of the optical drive. In another word, the servo controlling unit 102 is at a "Don't care" state to the signals received by the detect-tray-in-switch pin 104 and the detecttray-out-switch pin 106 when the optical drive does not execute the tray-in/tray-out action.

Moreover, the controlling chip 10 further comprises a detect-sled-limit-switch pin for detecting the position of a sled of the optical drive. FIG. 4 is a diagram showing a limit switch circuit for detecting the position of a sled of an optical drive. The detect-sled-limit-switch pin 108 is coupled to a voltage source (Vcc) through a resistance (R3). A second limit switch 18, coupled to the detect-sled-limit-switch pin 108 and the ground (GND), serves to connect the detect-sled-limit-switch pin 108 to the ground (GND) or not according to the position of the sled 16.

As known in the art, the sled 16 has to be moved to the most inner track of an optical disc when the tray 12, which is loaded with the optical disc, is at the complete-tray-in position. The position of the most inner track is defined as a sled-home position, and the process of moving the sled 16 to the sled-home position is defined as a move-sled-home action. As depicted in FIG. 4, the controlling chip 10 can determine the position of the sled 16 through the triggering of the second limit switch 18 when the optical drive is executing the move-sled-home action. For example, when the sled 16 mechanically triggers the second limit switch 18 in response to the sled 16 being moved to the move-sled-home position, the second limit switch 18 then connect the detect-sled-limit-switch pin 108 to the ground (GND), so as the detect-sled-limit-switch pin 108 receives a low-level signal changed from a high-level signal. When the servo controlling unit 102 determines that signal received by the detect-sled-limit-switch pin 108 is changed from the high-level signal to the low-level signal, the servo controlling unit 102 then stops driving the sled motor. In another word, when the sled 16 stop triggering the second limit switch 18 in response to the sled 16 leaving the move-sled-home position, servo controlling unit 102 determines that signal received by the detect-sled-limit-switch pin 108 is changed from the low-level signal to the high-level signal.

The detect-sled-limit-switch pin 108 is on duty only when the controlling chip 10 is detecting the position of the sled 16 under the optical drive executing the move-sled-home action. Out of the move-sled-home action, the signal at the detect-sled-limit-switch pin 108 does not make any affection to the operation of the optical drive. In another word, the servo controlling unit 102 is at a "Don't care" state to the signal received by the detect-sled-limit-switch pin 108 when the optical drive does not execute the move-sled-home action.

FIG. 5 is a diagram showing the signals at the detect-tray-in-switch pin, the detect-tray-out-switch pin, and the detect-sled-limit-switch pin during a process of an optical drive loading an optical disc in prior art. Before the time point t1, the tray 12 is at the complete-tray-out position and the user is ready to load an optical disc to an optical drive. At the complete-tray-out position, the detect-tray-in-switch pin 104 receives a high-level signal (Vcc) and the detect-tray-out-switch pin 106 receives a low-level signal (Gnd). Between the time point t1 and t2, the optical drive is executing the tray-in action. During execution of the tray-in action, the detect-tray-in-switch pin 104 receives a high-level signal (Vcc) and the detect-tray-out-switch pin 106 receives a high-level signal (Vcc). At the time point t2, the tray 12 is moved to the complete-tray-in position and the detect-tray-in-switch pin 104 receives a low-level signal (Gnd) and the detect-tray-out-switch pin 106 receives a high-level signal (Vcc). Therefore, the servo controlling unit 102 can determine the position of the tray 12 according to the signals at the detect-tray-in-switch pin 104 and the detect-tray-out-switch pin 106. In FIG. 5, the duration I refers to the time of the optical drive executing the tray-in/tray-out action. Out of the duration I, the servo controlling unit 102 is at a "Don't care" state to the signals at the detect-tray-in-switch pin 104 and the detect-tray-out-switch pin 106.

The optical drive must execute the move-sled-home action after the tray-in/tray-out action is finished. As depicted in FIG. 5, the duration II refers to the time of the optical drive executing the move-sled-home action. Between the time point t2 and t3, the sled 16 is moved to the move-sled-home position and the detect-sled-limit-switch pin 108 receives a high-level signal (Vcc) indicating that the sled 16 is not moved to the move-sled-home position. At the time point t3, the sled 16 is moved to the move-sled-home position and signal at the detect-sled-limit-switch pin 108 is changed from a high-level signal to a low-level signal (Gnd). At the time point t4, the move-sled-home action is finished in response to the sled 16 leaving the move-sled-home position, and the signal at the detect-sled-limit-switch pin 108 is changed from a low-level signal to a high-level signal (Vcc). Out of the move-sled-home action (duration II), the servo controlling unit 102 is at a "Don't care" state to the signal at the detect-sled-limit-switch pin 108.

Therefore, providing other appended functions to the optical drive when servo controlling unit 102 of the controlling chip 10 is at the "Don't care" state to signals at these three pins (the detect-tray-in-switch pin 104, the detect-tray-out-switch pin 106, and the detect-sled-limit-switch pin 108) is the purpose of the present invention.

SUMMARY OF THE INVENTION

Therefore, the present invention discloses a limit switch controlling circuit. In the present invention, the detect-tray-in-switch pin, the detect-tray-out-switch pin, and the detect-sled-limit-switch pin of the controlling chip can still receive or transmit signals when the optical drive is not executing the tray-in/tray-out action or the move-sled-home action.

The present invention provides a limit switch controlling circuit used in an optical drive, comprising: a controlling chip including a servo controlling unit, an appended-function unit, a switch, and a controlling pin, wherein the switch is for selectively connecting the controlling pin to the servo controlling unit or the appended-function unit; a resistance connected between the controlling pin and a first voltage source; a first blocking device having a first end connected to the controlling pin; a limit switch connected to a second end of the first blocking device and a second voltage source for selectively connecting the second voltage source to the first blocking device; a second blocking device having a first end connected to the controlling pin; and, an I/O port connected to a second end of the second blocking device; wherein when the switch is controlled to connected the servo controlling unit and the controlling pin, the servo controlling unit can determine whether the limit switch is connected to the second voltage or not; when the switch is controlled to connected the appended-function unit and the controlling pin, the appended-function unit can transmit/receive a signal to/from the I/O port.

The present invention provides a limit switch controlling method, applied to a limit switch controlling circuit comprising a controlling chip including a servo controlling unit, an appended-function unit, a switch, and a controlling pin, wherein the switch is for selectively connecting the controlling pin to the servo controlling unit or the appended-function unit; a resistance connected between the controlling pin and a first voltage source; a first blocking device having a first end connected to the controlling pin; a limit switch connected to a second end of the first blocking device and a second voltage source for selectively connecting the second voltage source to the first blocking device; a second blocking device having a first end connected to the controlling pin; and an I/O port connected to a second end of the second blocking device; comprising steps of: controlling the switch to connect the controlling pin and the servo controlling unit for the servo controlling unit to detect whether the second voltage is connected to the controlling pin or not when a tray-in/tray-out action or a move-sled-home action is executed; and controlling the controlling pin to connect the appended-function unit for the appended-function unit to transmit/receive a signal to/from the I/O port when the optical drive is not executing the tray-in/tray-out action or the move-sled-home action.

The present invention further provides a controlling chip including a servo controlling unit, an appended-function unit, a switch set, a detect-tray-in-switch pin, a detect-tray-out-switch pin, and a detect-sled-limit-switch pin, wherein the switch set is for selectively connecting the detect-tray-in-switch pin, the detect-tray-out-switch pin and the detect-sled-limit-switch pin to the servo controlling unit or the appended-function unit; a first resistance connected between the detect-tray-in-switch pin and a first voltage source; a second resistance connected between the detect-tray-out-switch pin and the first voltage source; a third resistance connected between the detect-sled-limit-switch pin and the first voltage source; a first limit switch having a first end, a second end, and a third end connected to a ground, wherein the first limit switch can be controlled to connect the first end to the second end or to connect the second end to the third end or to disconnect neither the first end nor the second end; a second limit switch having a first end, and a second end connected to the ground, wherein the second limit switch can be controlled to connect the first end to the second end or to disconnect the first end to the second; a first blocking device having a fourth resistance connected between the detect-tray-in-switch pin and the first end of the first limit switch, a fifth resistance connected between the detect-tray-out-switch pin and the second end of the first limit switch, and a sixth resistance connected between the detect-sled-limit-switch pin and the first end of the second limit switch; a first I/O port; a second I/O port; a third I/O port; and a second blocking device having a seventh resistance connected between the detect-tray-in-switch pin and the first I/O port, a eighth resistance connected between the detect-tray-out-switch pin and the second I/O port, and a ninth resistance connected between the detect-sled-limit-switch pin and the third I/O port; wherein when the switch set is controlled to connected the servo controlling unit to the detect-tray-in-switch pin, the detect-tray-out-switch pin, and the detect-sled-limit-switch pin, the servo controlling unit can determine whether the detect-tray-in-switch pin, the detect-tray-out-switch pin, and the detect-sled-limit-switch pin are connected to the second voltage or not; when the switch is controlled to connected the appended-function unit to the detect-tray-in-switch pin, the detect-tray-out-switch pin, and the detect-sled-limit-switch pin, the appended-function unit can transmit/receive signals to/from the first I/O port, the second I/O port, and the third I/O port.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 6:
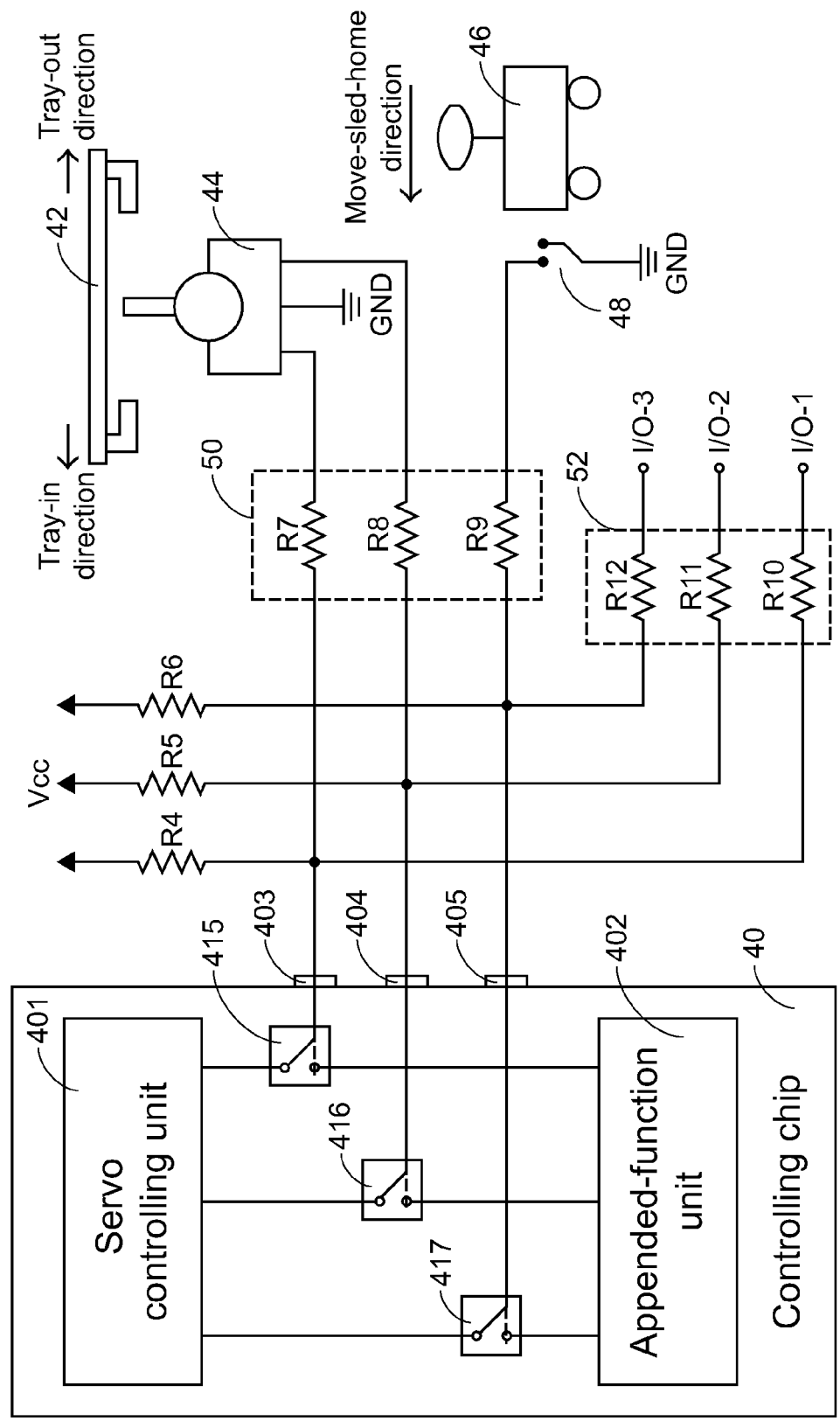
FIG. 6 is a diagram showing a limit switch circuit of the present invention.

FIG. 6 is a diagram showing a limit switch circuit of the present invention. The limit switch circuit, for detecting the positions of a tray and a sled of an optical drive, comprises: a controlling chip 40, a tray 42, a sled 46, a first limit switch 44, and a second limit switch 48. The controlling chip 40 further comprises: a servo controlling unit 401, an appended-function unit 402, a detect-tray-in-switch pin 403, a detect-tray-out-switch pin 404, a detect-sled-limit-switch pin 405, a first switch 415, a second switch 416, and a third switch 417. As depicted in FIG. 6, the detect-tray-in-switch pin 403 is coupled to a voltage source (Vcc) through a resistance (R4); the detect-tray-in-switch pin 403 is coupled to the first limit switch 44 through a resistance (R7); the detect-tray-out-switch pin 404 is coupled to the voltage source (Vcc) through a resistance (R5); the detect-tray-out-switch pin 404 is coupled to the first limit switch 44 through a resistance (R8); the detect-sled-limit-switch pin 405 is coupled to the voltage source (Vcc) through a resistance (R6); the detect-sled-limit-switch pin 405 is coupled to the second limit switch 48 through a resistance (R9); the detect-tray-in-switch pin 403 is coupled to a first I/O port (I/O-1) through a resistance (R10); the detect-tray-out-switch pin 404 is coupled to a second I/O port (I/O-2) through a resistance (R11); and the detect-sled-limit-switch pin 405 is coupled to a third I/O port (I/O-3) through a resistance (R12). Wherein the resistances (R7, R8, R9) are together defined as a first blocking device 50, the resistances (R10, R11, R12) are together defined as a second blocking device 52, and another ends of the first limit switch 44 and the second limit switch 48 are coupled to a ground (GND).

Moreover, the first switch 415 is controlled to connect between the detect-tray-in-switch pin 403 and the servo controlling unit 401 or between the detect-tray-in-switch pin 403 and the appended function unit 402. Accordingly, the second switch 416 is controlled to connect between the detect-tray-out-switch pin 404 and the servo controlling unit 401 or between the detect-tray-out-switch pin 404 and the appended function unit 402. Accordingly, the third switch 417 is controlled to connect between the detect-sled-limit-switch pin 405 and the servo controlling unit 401 or between to detect-sled-limit-switch pin 405 and the appended function unit 402

For example, when the optical drive executing the tray-in/tray-out action under user pressing the eject button of the optical drive, the first switch 415 and the second switch 416 are controlled to connect the detect-tray-in-switch pin 403 and detect-tray-out-switch pin 404 to the servo controlling unit 401. Because there is a resistance (R7) of the first blocking device 50 coupled between the detect-tray-in-switch pin 403 and the first limit switch 44, the signal at the detect-tray-in-switch pin 403 can still stay at a low-level signal, i.e. Vcc[R7/(R4+R7)], by carefully calculating the resistance value of R4 and R7 when the tray 42 is moved to the complete-tray-in position. Accordingly, because there is a resistance (R8) of the first blocking device 50 coupled between the detect-tray-out-switch pin 404 and the first limit switch 44, the signal at the detect-tray-out-switch pin 404 can still stay at a low-level signal, i.e. Vcc[R8/(R5+R8)], by carefully calculating the resistance value of R5 and R8 when the tray 42 is moved to the complete-tray-out position.

When the optical drive is executing the move-sled-home action, the third switch 417 is controlled to connect the detect-sled-limit-switch pin 405 to the servo controlling unit 401. Because there is a resistance (R9) of the first blocking device 50 coupled between the detect-sled-limit-switch pin 405 and the second limit switch 48, the signal at the detect-sled-limit-switch pin 405 can still stay at a low-level signal, i.e. Vcc[R9/(R6+R9)], by carefully calculating the resistance value of R6 and R9 when the tray 42 is moved to the move-sled-home position.

When the optical drive is not executing the tray-in/tray-out action, the servo controlling unit 401 is at a "Don't Care" state to the signals at the detect-tray-in-switch pin 403 and the detect-tray-out-switch pin 404. Moreover, when the optical drive is not executing the move-sled-home action, the servo controlling unit 401 is at a "Don't Care" state to the signal at the detect-sled-limit-switch pin 405. That is to say when the controlling unit 401 is at a "Don't Care" state, the first switch 415, the second switch 416, and the third switch 417 of the present invention are designed to connect the detect-tray-in-switch pin 403, the detect-tray-out-switch pin 404, and the detect-sled-limit-switch pin 405 to the appended-function unit 402.

Figure 7:
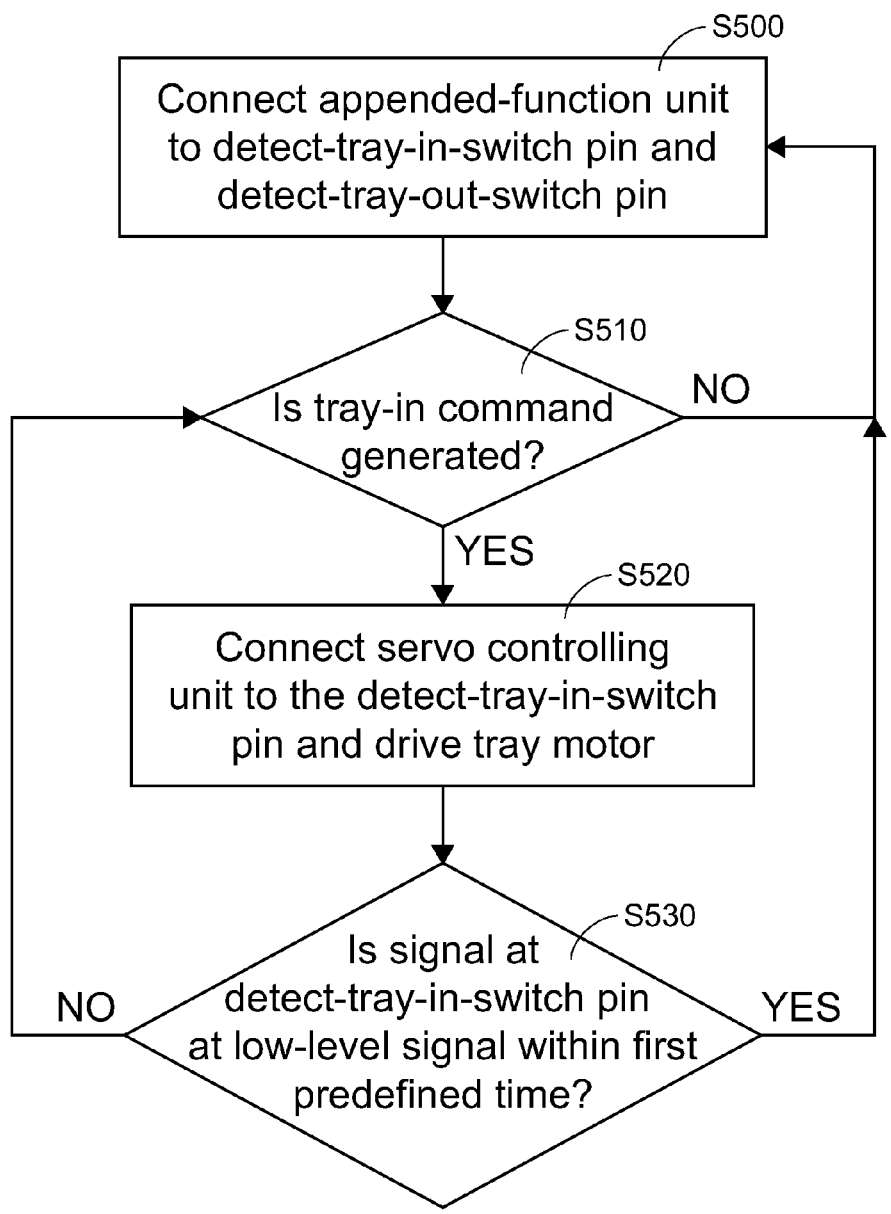
FIG. 7 is a flow chart showing the controlling steps in firmware of the present invention when a tray is at the complete-tray-out position.

FIG. 7 is a flow chart showing the controlling steps in firmware of the present invention when a tray is at the complete-tray-out position. Because the tray is at the complete-tray-out position which representing the optical drive is not executing the tray-in/tray-out action, the detect-tray-in-switch pin and the detect-tray-out-switch pin are connected to the appended-function unit (S500). That is to say, the detect-tray-in-switch pin and the detect-tray-out-switch pin are under the controlling of the appended-function unit (S500) before the optical drive generating a tray-in command which representing users pressing the eject button (S510). When the optical drive generates the tray-in command in response to the user pressing the eject button (S510), at least the detect-tray-in-switch pin is connected to the servo controlling unit for monitoring, and the servo controlling unit then receives the signal at the detect-tray-in-switch pin and drives the tray motor (S520), wherein the driving of the tray motor is defined as the tray-in/tray-out action. When the tray-in/tray-out action is finished according to the signal at the detect-tray-in pin is detected at a low-level signal within a first predefined time (S530), the detect-tray-in-switch pin and the detect-tray-out-switch pin are connected to the appended-function unit (S500). If the tray-in/tray-out action is determined to fail according to the signal at the detect-tray-in-switch pin is detected not at a low-level signal within the first predefined time (S530), the controlling step goes back to the step of generating the tray-in command (S510), and waits for user repressing the eject button again.

Figure 8:
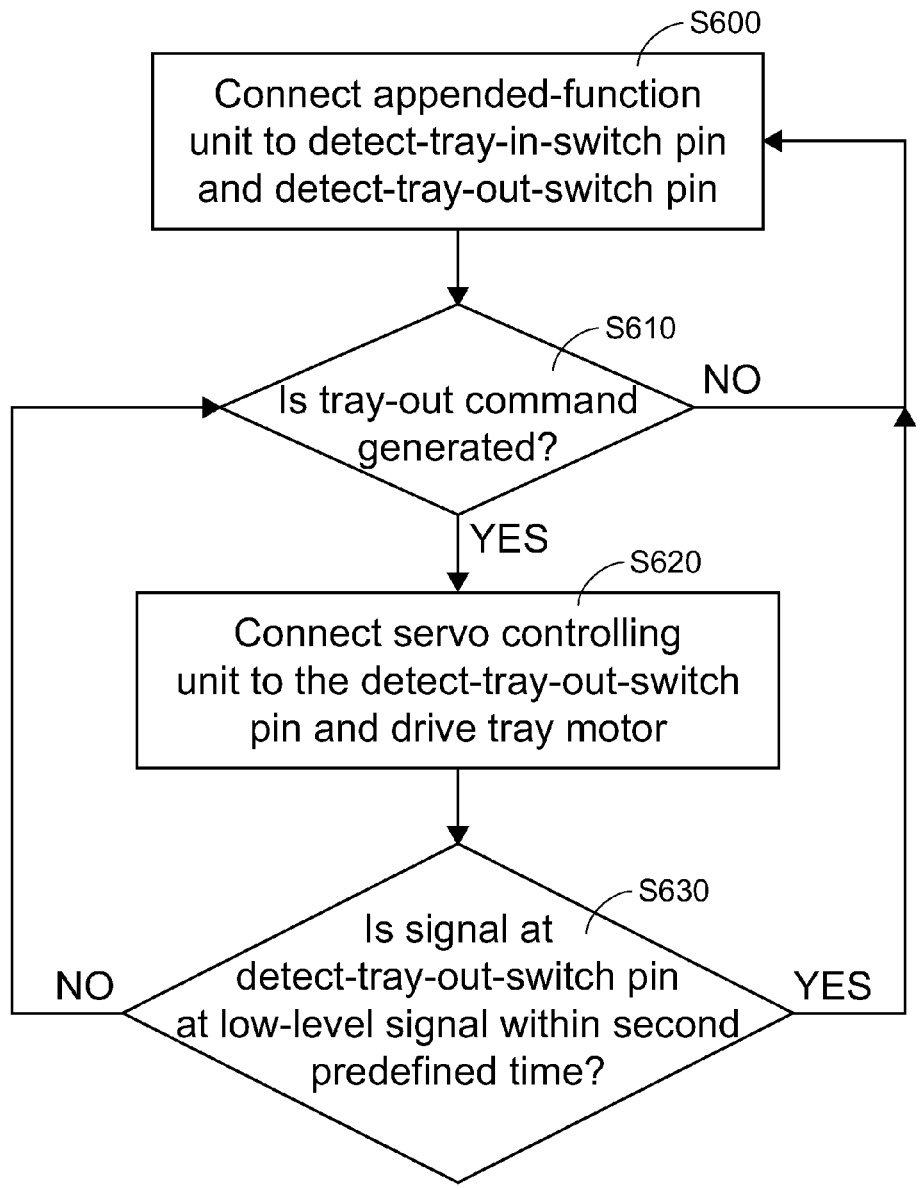
FIG. 8 is a flow chart showing the controlling steps in firmware of the present invention when a tray is at the complete-tray-in position.

FIG. 8 is a flow chart showing the controlling steps in firmware of the present invention when a tray is at the complete-tray-in position. Because the tray is at the complete-tray-in position which representing the optical drive is not executing the tray-in/tray-out action, the detect-tray-in-switch pin and the detect-tray-out-switch pin are connected to the appended-function unit (S600). That is to say, the detect-tray-in-switch pin and the detect-tray-out-switch pin are under the controlling of the appended-function unit (S600) before the optical drive generating a tray-out command which representing user pressing the eject button (S610). When the optical drive generates the tray-out command in response to the user pressing the eject button (S610), at least the detect-tray-out-switch pin is connected to the servo controlling unit for monitoring, and the servo controlling unit then receives the signal at the detect-tray-out-switch pin and drives the tray motor (S620), wherein the driving of the tray motor is defined as the tray-in/tray-out action. When the tray-in/tray-out action is finished according to the signal at the detect-tray-out pin is detected at a low-level signal within a second predefined time (S630), the detect-tray-in-switch pin and the detect-tray-out-switch pin are connected to the appended-function unit (S600). If the tray-in/tray-out action is determined to fail according to the signal at the detect-tray-out-switch pin is detected not at a low-level signal within the second predefined time (S630), the controlling step goes back to the step of generating the tray-out command (S610), and waits for user repressing the eject button again.

Figure 9:
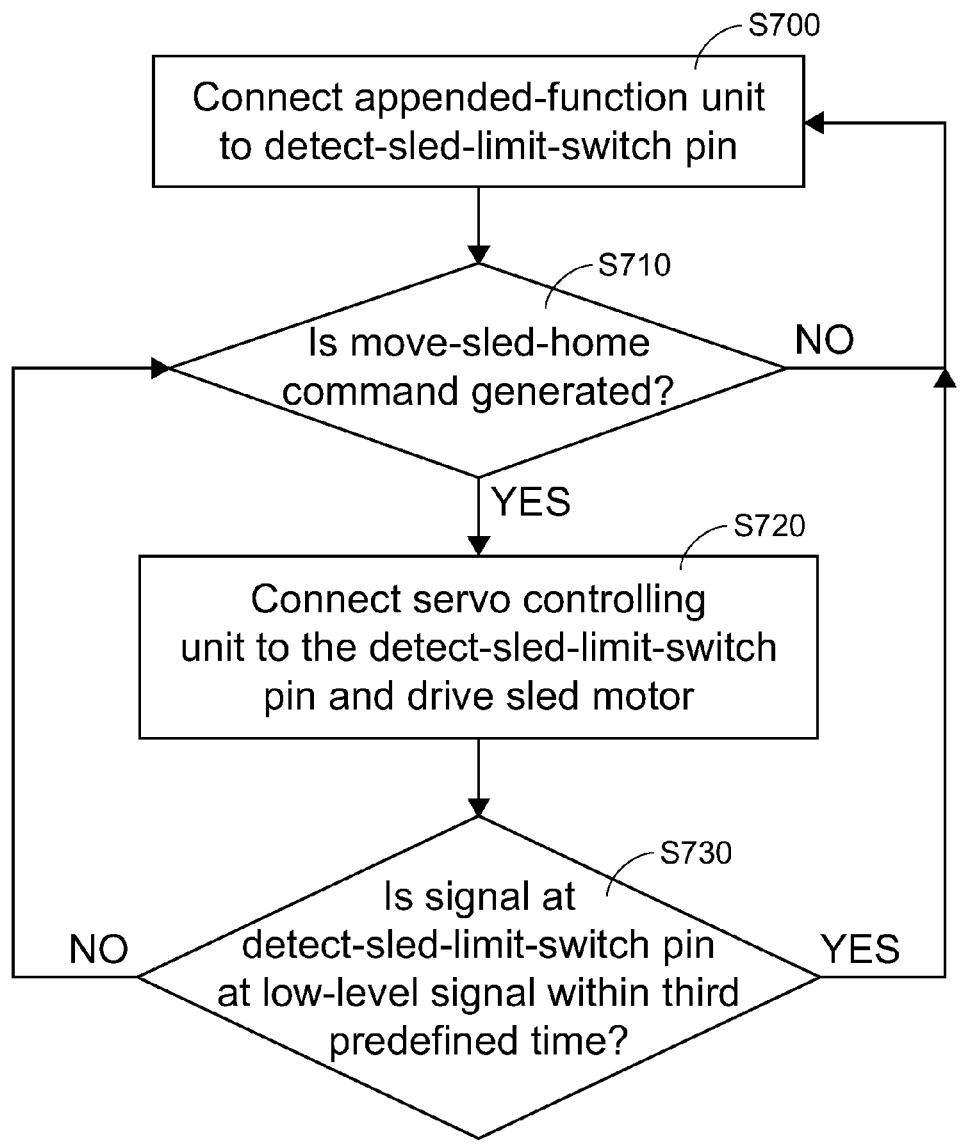
FIG. 9 is a flow chart showing the controlling steps in firmware of the present invention when an optical drive executing the move-sled-home action.

FIG. 9 is a flow chart showing the controlling steps in firmware of the present invention before an optical drive executing the move-sled-home action. Before the optical drive executing the move-sled-home action, the detect-sled-limit-switch pin is connected to the appended-function unit (S700). The detect-sled-limit-switch pin is under the controlling of the appended-function unit (S700) before the optical drive generating a sled-home command which representing the tray is moved to the complete-tray-in position (S710). When the optical drive generates the sled-home command in response to the tray is moved to the complete-tray-in position (S710), the detect-sled-limit-switch pin is connected to the servo controlling unit, and the servo controlling unit then receives the signal at the detect-sled-limit-switch pin and drives the sled motor (S720), wherein the driving of the sled motor is defined as the move-sled-home action. When the move-sled-home action is finished according to the signal at the detect-sled-limit-switch pin is detected at a low-level signal within a third predefined time (S730), the detect-sled-limit-switch pin is connected to the appended-function unit (S700). If the move-sled-home action is determined to fail according to the signal at the detect-sled-limit-switch pin is detected not at a low-level signal within the third predefined time (S730), the controlling step goes back to the step of generating the sled-home command (S710), and waits for the optical drive re-generating the sled-home command again.

For example, if the controlling chip 40 is a optical player chip, the appended-function unit 402 can be a display-controlling unit for outputting a VGA synchronous output signal. In another word, the detect-tray-in-switch pin 403, the detect-tray-out-switch pin 404, or the detect-sled-limit-switch pin 405 can output the VGA synchronous output signal when the optical drive is not executing the tray-in/tray-out action and the move-sled-home action. It is understood that the function of the appended-function unit 402 is not limit in the present invention. The appended-function unit 402 can be a serial-interface unit for outputting an I²C signal; a card-storage-interface unit for accessing a storage card; a SCART-connector unit for outputting a SCART signal; or a game-joystick unit for outputting a game-joystick signal.

Please refer to FIG. 6 again. When the detect-tray-in-switch pin 403, the detect-tray-out-switch pin 404, and the detect-sled-limit-switch pin 405 are respectively connected to the appended-function unit 402 through the first switch 415, the second switch 416, and the third switch 417, a first I/O signal generated by the appended-function unit 402 can be outputted through the detect-tray-in-switch pin 403, the second blocking device 52, and to the first I/O port (I/O-1) due to the first blocking device 50 can block the signal generated by the first limit switch 44; a second I/O signal generated by the appended-function unit 402 can be outputted through the detect-tray-out-switch pin 404, the second blocking device 52, and to the second I/O port (I/O-2) due to the first blocking device 50 can block the signal generated by the first limit switch 44; and a third I/O signal generated by the appended-function unit 402 can be outputted through the detect-sled-limit-switch pin 405, the second blocking device 52, and the third I/O port (I/O-3) due to the first blocking device 50 can block the signal generated by the second limit switch 48. Furthermore, the first I/O signal received by the first I/O port (I/O-1) also can be received by the appended-function unit 402 through the second blocking device 52 and the detect-tray-in-switch pin 403; the second I/O signal received by the second I/O port (I/O-2) can be received by the appended-function unit 402 through the second blocking device 52 and the detect-tray-out-switch pin 404; and the third I/O signal received by the third I/O port (I/O-3) can be received by the appended-function unit 402 through the second blocking device 52 and the detect-sled-limit-switch pin 405.

Therefore, the signals (high-level signal or low-level signal) outputted from the appended-function unit 420 can be recognized by the devices connected to the first I/O port (I/O-1), the second I/O port (I/O-2), and the third I/O port (I/O-3) after adjusting the ratio of the resistance (R4) to resistance (R10); the ratio of the resistance (R5) to resistance (R11); and the ratio of the resistance (R6) to resistance (R12). Accordingly, the signals (high-level signal or low-level signal) outputted from the devices connected to the first I/O port (I/O-1), the second I/O port (I/O-2), and the third I/O port (I/O-3) can be also recognized by the appended-function unit 402. Moreover, the second blocking device 52 can block the signals at the first I/O port (I/O-1), the second I/O port (I/O-2), and the third I/O port (I/O-3) when the optical drive is executing the tray-in/tray-out action or the move-sled-home action.

Figure 1:
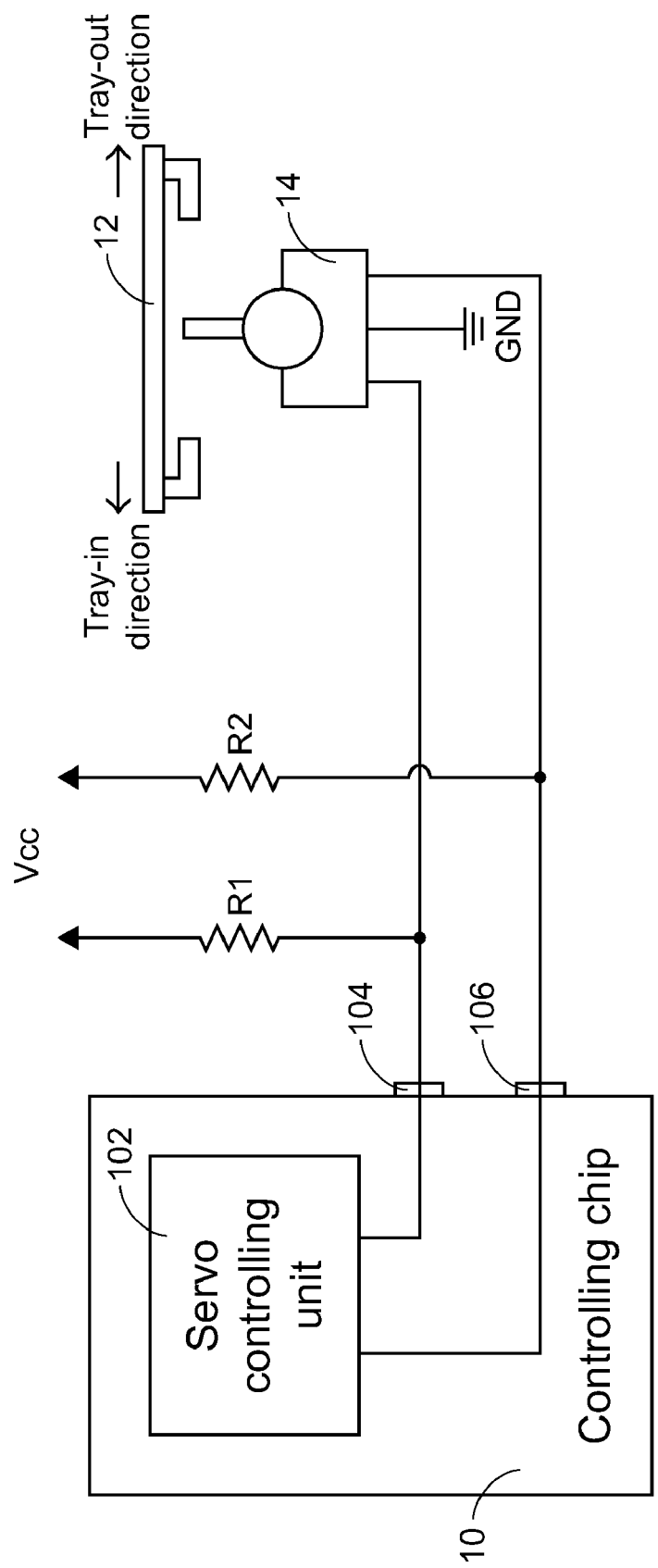
FIG. 1 is a diagram showing a limit switch circuit for detecting the position of a tray of an optical drive in prior art.
Figure 2:
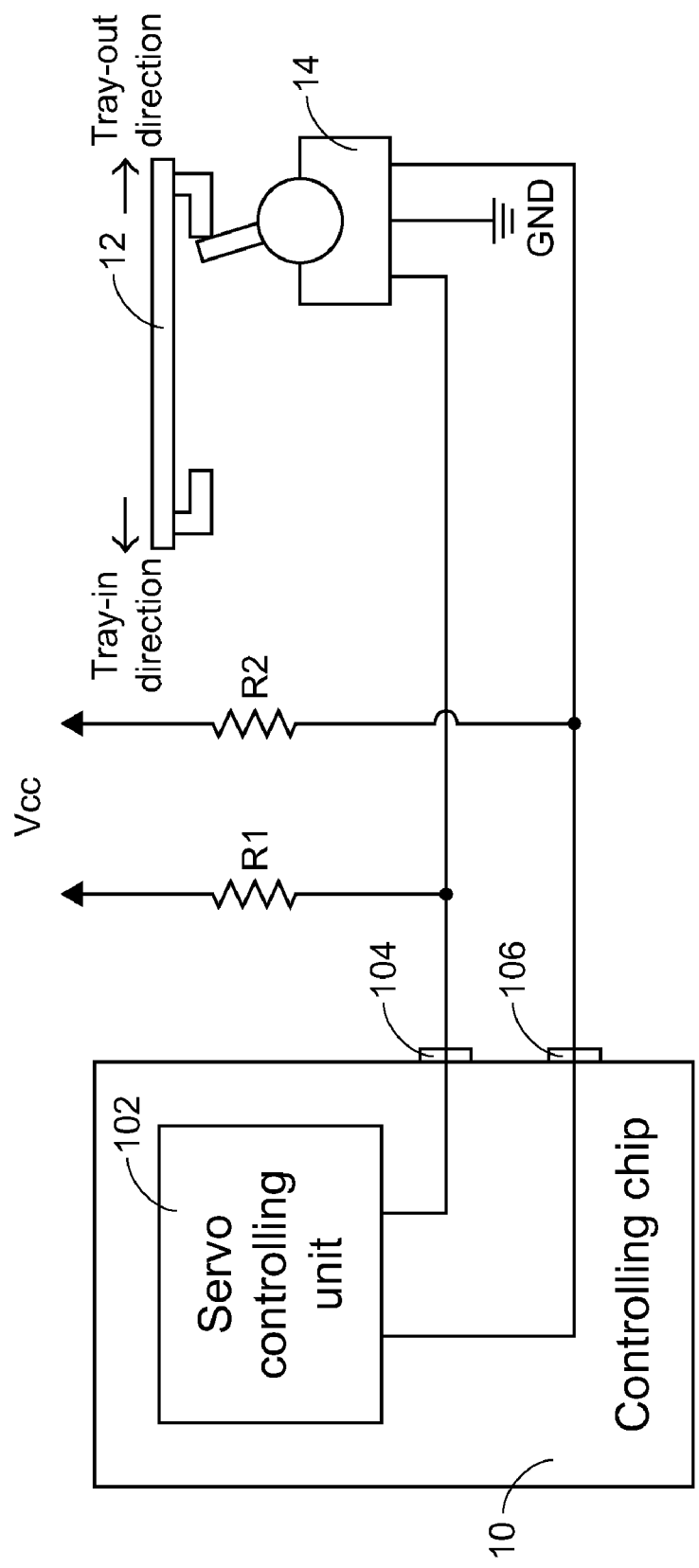
FIG. 2 is a diagram showing the limit switch circuit when the tray 12 is moved at the complete-tray-in position in prior art.
Figure 3:
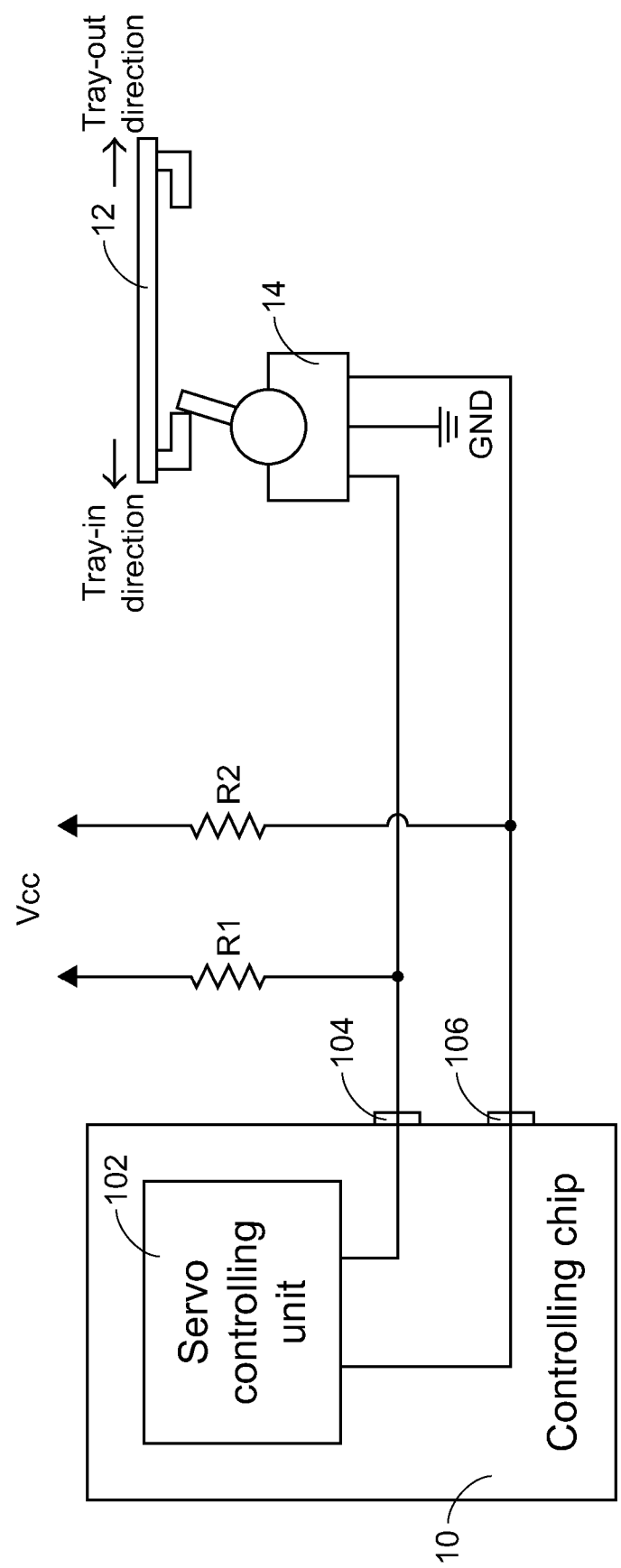
FIG. 3 is a diagram showing the limit switch circuit when the tray 12 is moved at the complete-tray-out position in prior art.
Figure 4:
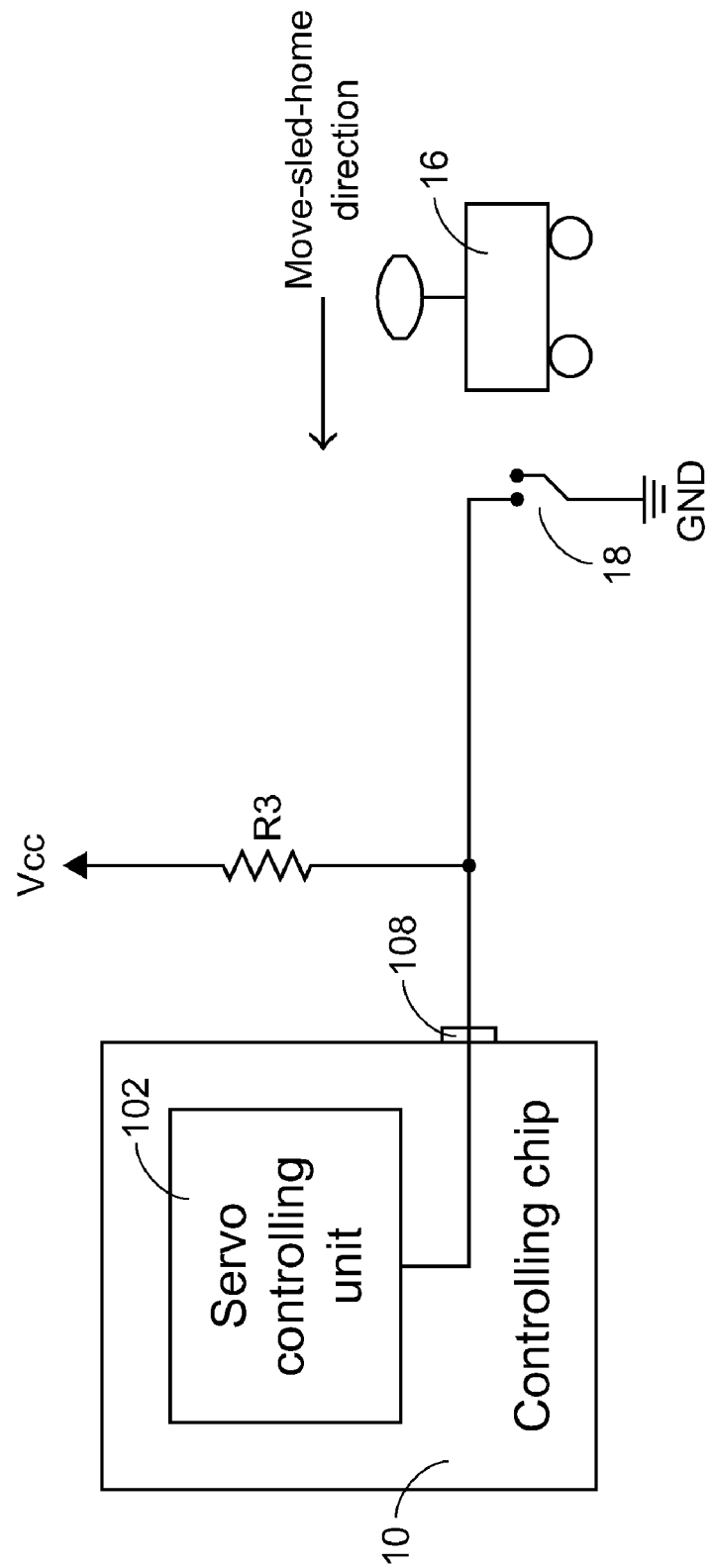
FIG. 4 is a diagram showing a limit switch circuit for detecting the position of a sled of an optical drive in prior art.
Figure 5:
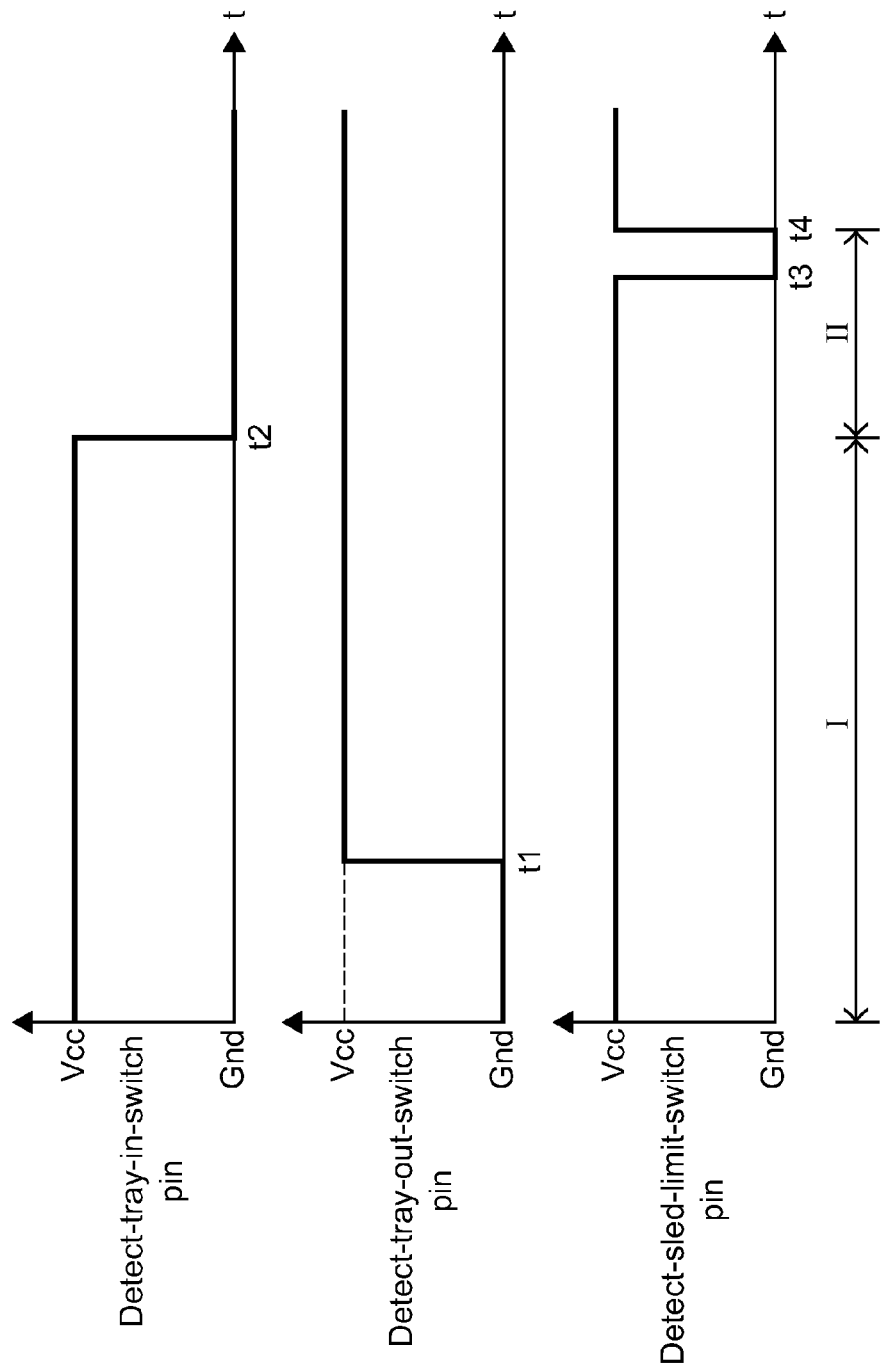
FIG. 5 is a diagram showing the signals at the detect-tray-in-switch pin, the detect-tray-out-switch pin, and the detect-sled-limit-switch pin during a process of an optical drive loading an optical disc in prior art.
Figure 10:
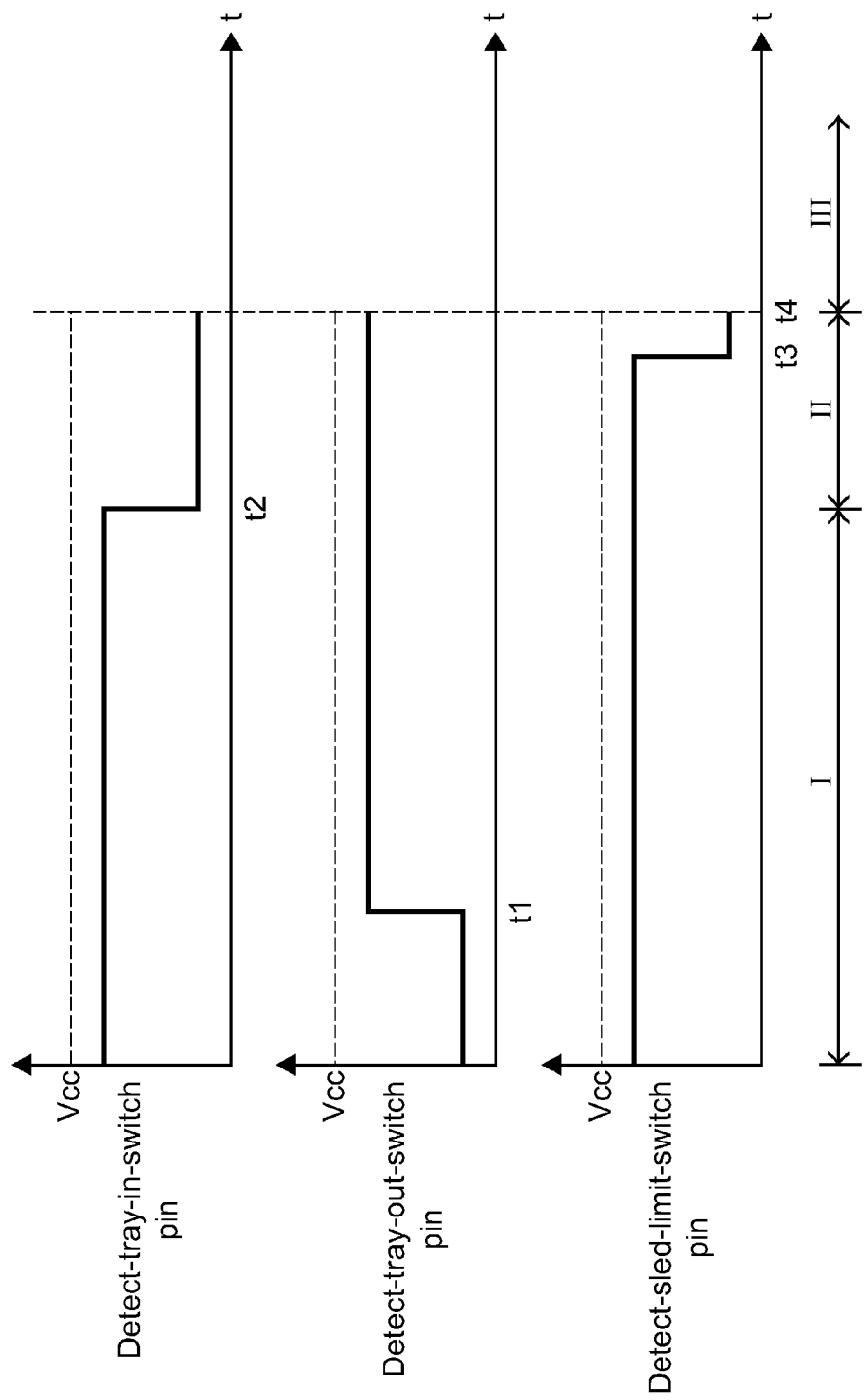
FIG. 10 is a diagram showing the signals at the detect-tray-in-switch pin, the detect-tray-out-switch pin, and the detect-sled-limit-switch pin during a process of an optical drive loading an optical disc of the present invention.

FIG. 10 is a diagram showing the signals at the detect-tray-in-switch pin, the detect-tray-out-switch pin, and the detect-sled-limit-switch pin during a process of an optical drive loading an optical disc of the present invention. Before the time point t1, the tray 42 is at the complete-tray-out position for user to load the optical disc to the optical drive, the signal at the detect-tray-in-switch pin 403 is at a high-level signal and the signal at the detect-tray-out-switch pin 404 is at a low-level signal. Between the time point t1 and t2, the optical drive is executing the tray-in action and the signal at the detect-tray-in-switch pin 403 is at a high-level signal and the signal at the detect-tray-out-switch pin 404 is at a high-level signal. At the time point t2, the tray 42 is moved to the complete-tray-in position, the signal at the detect-tray-in-switch pin 403 is at a low-level signal and the signal at the detect-tray-out-switch pin 404 is at a high-level signal. In other word, the servo controlling unit 401 can determine the position of the tray 42 according to the signals at the detect-tray-in-switch pin 403 and the detect-tray-out-switch pin 404. In FIG. 5, the duration I refers to the time of the optical drive executing the tray-in/tray-out action. Out of the duration I, the servo controlling unit 401 is at a "Don't care" state to the signals at the detect-tray-in-switch pin 403 and the detect-tray-out-switch pin 404.

The optical drive must execute the move-sled-home action after the tray-in/tray-out action is finished. As depicted in FIG. 10, the duration II refers to the time of the optical drive executing the move-sled-home action. Between the time point t2 and t3, the sled 46 is moving to the move-sled-home position and the signal at the detect-sled-limit-switch pin 405 is at a high-level signal. At the time point t3, the sled 46 is moved to the move-sled-home position and the signal at the detect-sled-limit-switch pin 405 is at a low-level signal. At the time point t4, of the move-sled-home action is finished and the sled 46 is leaving the move-sled-home position and the signal at the detect-sled-limit-switch pin 405 is changed to a high-level signal. Out of the move-sled-home action (duration II), the servo controlling unit 401 is at a "Don't care" state to the signal at the detect-sled-limit-switch pin 405.

When the controlling chip 40 is not in the tray-in/tray-out action (duration I) and the move-sled-home action (duration II), the appended-function unit 402 can generate signals and then output the signals to the first I/O port (I/O-1), the second I/O port (I/O-2), or the third I/O port (I/O-3); or the signals received by the first I/O port (I/O-1), the second I/O port (I/O-2), or the third I/O port (I/O-3) can be transmitted to the appended-function unit 402. Because signals can be transmitted between the appended-function unit 420 and the I/O ports (I/O-1, I/O-2, and I/O-3), the controlling pins having multiple functions can be achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A limit switch controlling circuit used in an optical drive, comprising:
   a controlling chip, including a servo controlling unit, an appended-function unit, a switch, and a controlling pin, wherein the switch is for selectively connecting the controlling pin to the servo controlling unit or the appended-function unit;
   a resistance, connected between the controlling pin and a first voltage source;
   a first blocking device, having a first end connected to the controlling pin;
   a limit switch, connected to a second end of the first blocking device and a second voltage source, for selectively connecting the second voltage source to the first blocking device;
   a second blocking device, having a first end connected to the controlling pin; and
   an I/O port, connected to a second end of the second blocking device;
   wherein when the switch is controlled to connected the servo controlling unit and the controlling pin, the servo controlling unit determines whether the limit switch is connected to the second voltage or not, and when the switch is controlled to connected the appended-function unit and the controlling pin, the appended-function unit transmits/receives a signal to/from the I/O port respectively.

2. The limit switch controlling circuit according to claim 1, wherein the first voltage source is a supplying voltage and the second voltage source is a ground voltage.

3. The limit switch controlling circuit according to claim 1, wherein the first blocking device and the second blocking device are resistance devices.

4. The limit switch controlling circuit according to claim 1, wherein the controlling pin is a detect-tray-in-switch pin, a detect-tray-out-switch pin, or a detect-sled-limit-switch pin.

5. The limit switch controlling circuit according to claim 1, wherein a tray of the optical drive is controlled to execute a tray-in/tray-out action when the controlling pin is connected to the servo controlling unit.

6. The limit switch controlling circuit according to claim 5, wherein the tray-in/tray-out action starts at an eject button being pressed and ends at the tray being moved to a complete-tray-out position or a complete-tray-in position.

7. The limit switch controlling circuit according to claim 1, wherein a sled of the optical drive is controlled to execute a move-sled-home action when the controlling pin is connected to the servo controlling unit.

8. The limit switch controlling circuit according to claim 7, wherein the move-sled-home action starts at a tray of the optical drive being moved to a complete-tray-in position and ends at the sled being moved to a move-sled-home position.

9. The limit switch controlling circuit according to claim 1, wherein the appended-function unit is a displaying unit for outputting a VGA synchronous output signal, a serial-interface unit for outputting an $I^2C$ signal, a storage-card-interface unit for accessing a storage card, a SCART-connector unit for outputting a SCART-connector signal, or a game-joystick unit for outputting a game-joystick signal.

10. A limit switch controlling method, applied to a limit switch controlling circuit comprising a controlling chip including a servo controlling unit, an appended-function unit, a switch, and a controlling pin, wherein the switch is for selectively connecting the controlling pin to the servo controlling unit or the appended-function unit; a resistance connected between the controlling pin and a first voltage source; a first blocking device having a first end connected to the controlling pin; a limit switch connected to a second end of the first blocking device and a second voltage for selectively connecting the second voltage to the first blocking device; a second blocking device having a first end connected to the controlling pin; and an I/O port connected to a second end of the second blocking device; comprising steps of:

controlling the switch to connect the controlling pin and the servo controlling unit for the servo controlling unit to detect whether the second voltage is connected to the controlling pin or not when a tray-in/tray-out action or a move-sled-home action is executed; and controlling the controlling pin to connect the appended-function unit for the appended-function unit to transmit/receive a signal to/from the I/O port respectively when the optical drive is not executing the tray-in/tray-out action or the move-sled-home action.

11. The method according to claim 10, wherein the tray-in/tray-out action starts at an eject button being pressed and ends at a tray being moved to a complete-tray-out position or a complete-tray-in position.

12. The method according to claim 10, wherein the move-sled-home action starts at a tray of the optical drive being moved to a complete-tray-in position and ends at the sled being moved to a move-sled-home position.

13. A limit switch controlling circuit used in an optical drive, comprising:

a controlling chip including a servo controlling unit, an appended-function unit, a switch set, a detect-tray-in-switch pin, a detect-tray-out-switch pin, and a detect-sled-limit-switch pin, wherein the switch set is for selectively connecting the detect-tray-in-switch pin, the detect-tray-out-switch pin and the detect-sled-limit-switch pin to the servo controlling unit or the appended-function unit;

a first resistance, connected between the detect-tray-in-switch pin and a first voltage source;

a second resistance, connected between the detect-tray-out-switch pin and the first voltage source;

a third resistance, connected between the detect-sled-limit-switch pin and the first voltage source;

a first limit switch, having a first end, a second end, and a third end connected to a second voltage, wherein the first limit switch is controlled to connect the first end to the second end or to connect the second end to the third end or to disconnect neither the first end nor the second end;

a second limit switch, having a first end, and a second end connected to the second voltage, wherein the second limit switch is controlled to connect the first end to the second end or to disconnect the first end to the second;

a first blocking device having a fourth resistance connected between the detect-tray-in-switch pin and the first end of the first limit switch, a fifth resistance connected between the detect-tray-out-switch pin and the second end of the first limit switch, and a sixth resistance connected between the detect-sled-limit-switch pin and the first end of the second limit switch;

a first I/O port;
a second I/O port;
a third I/O port; and a second blocking device, having a seventh resistance connected between the detect-tray-in-switch pin and the first I/O port, a eighth resistance connected between the detect-tray-out-switch pin and the second I/O port, and a ninth resistance connected between the detect-sled-limit-switch pin and the third I/O port;

wherein when the switch set is controlled to connected the servo controlling unit to the detect-tray-in-switch pin, the detect-tray-out-switch pin, and the detect-sled-limit-switch pin, the servo controlling unit determines whether the detect-tray-in-switch pin, the detect-tray-out-switch pin, and the detect-sled-limit-switch pin are connected to the second voltage or not; when the switch is controlled to connected the appended-function unit to the detect-tray-in-switch pin, the detect-tray-out-switch pin, and the detect-sled-limit-switch pin, the appended-function unit transmits signals to the first I/O port, the second I/O port, and the third I/O port according to the detect-tray-in-switch pin, the detect-tray-out-switch pin, and the detect-sled-limit-switch pin, or the appended-function unit receives the signals from the first I/O port, the second I/O port, and the third I/O port according to the detect-tray-in-switch pin, the detect-tray-out-switch pin, and the detect-sled-limit-switch pin.

14. The limit switch controlling circuit according to claim 13, wherein a tray of the optical drive is controlled to execute a tray-in/tray-out action when the detect-tray-in-switch pin and the detect-tray-out-switch pin are connected to the servo controlling unit.

15. The limit switch controlling circuit according to claim 14, wherein the tray-in/tray-out action starts at an eject button is pressed and ends at the tray is moved to a complete-tray-out position or a complete-tray-in position.

16. The limit switch controlling circuit according to claim 13, wherein a sled of the optical drive is controlled to execute a move-sled-home action when the detect-sled-limit-switch pin is connected to the servo controlling unit.

17. The limit switch controlling circuit according to claim 16, wherein the move-sled-home action starts at a tray of the optical drive being moved to a complete-tray-in position and ends at the sled being moved to a move-sled-home position.

18. The limit switch controlling circuit according to claim 13, wherein the appended-function unit is a displaying unit for outputting a VGA synchronous output signal, a serial-interface unit for outputting an $I^2C$ signal, a storage-card-interface unit for accessing a storage card, a SCART-connector unit for outputting a SCART-connector signal, or a game-joystick unit for outputting a game-joystick signal.

* * * * *